(12) United States Patent
Huang et al.

(10) Patent No.: US 12,371,994 B2
(45) Date of Patent: Jul. 29, 2025

(54) CONTROL APPARATUS AND METHOD FOR BUOYANCY ADJUSTMENT OF SHIELD TUNNEL SEGMENTS

(71) Applicants: Shenzhen Campus of Sun Yat-sen university, Shenzhen (CN); Sun Yat-sen university, Guangzhou (CN); SOUTHERN MARINE SCIENCE AND ENGINEERING GUANGDONG LABORATORY (ZHU HAI), Zhuhai (CN)

(72) Inventors: Linchong Huang, Guangzhou (CN); Xumin Huang, Guangzhou (CN); Yu Liang, Guangzhou (CN); Chenyang Zhao, Guangzhou (CN); Cungang Lin, Guangzhou (CN)

(73) Assignees: Shenzhen Campus of Sun Yat-sen university, Shenzhen (CN); Sun Yat-sen university, Guangzhou (CN); SOUTHERN MARINE SCIENCE AND ENGINEERING GUANGDONG HAI), Zhuhai (CN)

( * ) Notice: Subject to any disclaimer, the term of this patent is extended or adjusted under 35 U.S.C. 154(b) by 0 days.

(21) Appl. No.: 18/929,709

(22) Filed: Oct. 29, 2024

(65) Prior Publication Data
US 2025/0067177 A1 Feb. 27, 2025

Related U.S. Application Data

(63) Continuation-in-part of application No. PCT/CN2023/133701, filed on Nov. 23, 2023.

(51) Int. Cl.
*E21D 11/08* (2006.01)
*E21D 20/02* (2006.01)

(52) U.S. Cl.
CPC ............ *E21D 11/083* (2013.01); *E21D 20/02* (2013.01)

(58) Field of Classification Search
CPC ....... E21D 11/08; E21D 11/083; E21D 20/02; E21D 20/025; E21D 21/0033
See application file for complete search history.

(56) References Cited

U.S. PATENT DOCUMENTS

2014/0037388 A1* 2/2014 Ahola ................. F16B 13/066
405/259.5
2015/0322785 A1* 11/2015 Ahola ................. E21D 21/0033
405/259.5

FOREIGN PATENT DOCUMENTS

CN 108979690 A 12/2018
CN 109026068 B 12/2018
(Continued)

*Primary Examiner* — Amber R Anderson
*Assistant Examiner* — Stacy N Lawson
(74) *Attorney, Agent, or Firm* — JEEN IP LAW, LLC (57) ABSTRACT

The present invention discloses a control apparatus and method for buoyancy adjustment of shield tunnel segments, wherein the inner end wall of anchor rod accommodating cavity is provided with a first slurry channel extending forward to the outer peripheral wall of anchor rod, the countersunk bolt is provided with a second slurry channel passing through the front and rear end faces of the countersunk bolt, and a locking structure is disposed in the accommodating cavity to lock the countersunk bolt in the accommodating cavity and connect the first slurry channel and second slurry channel. The entire construction process which can be carried out during the construction or operation period greatly reduces construction costs and space.

12 Claims, 8 Drawing Sheets

(56) References Cited

FOREIGN PATENT DOCUMENTS

| | | |
|---|---|---|
| CN | 110836121 A | 2/2020 |
| CN | 210317328 U | 4/2020 |
| CN | 213063587 U | 4/2021 |
| CN | 213476969 U | 6/2021 |
| CN | 113294188 B | 8/2021 |
| CN | 216275659 U | 4/2022 |
| CN | 216741536 U | 6/2022 |
| CN | 216841699 U | 6/2022 |
| CN | 218669429 U | 3/2023 |
| CN | 116464477 A | 7/2023 |
| EP | 2199542 A1 * | 6/2010 ............ E21D 20/02 |
| JP | 9328771 B2 | 12/1997 |
| WO | 2021223400 A1 | 11/2021 |

* cited by examiner

CONTROL APPARATUS AND METHOD FOR BUOYANCY ADJUSTMENT OF SHIELD TUNNEL SEGMENTS

CROSS-REFERENCE TO RELATED APPLICATIONS

PCT/CN2023/133701, filed on Nov. 23, 2023, which claims priority to Chinese Patent Application No. 202310559741.2, filed on May 17, 2023, both of which are hereby incorporated by reference in their entireties.

This application is a continuation of International Application No.

TECHNICAL FIELD

The present invention belongs to the field of tunnel engineering technology, and particularly relates to a control apparatus and method for buoyancy adjustment of shield tunnel segments.

BACKGROUND

During the construction and operation periods, shield tunnels often experience buoyancy. The buoyancy during construction period is caused by the action of construction loads and soil and water loads, while the buoyancy during operation period usually relates to the fact that the excavation above shield tunnels (such as excavation of foundation pits or of new tunnels) leads to the rebound of unloaded overlying soil.

Generally speaking, shield tunnel is a discontinuous structure composed of segments and bolts that has a large number of joints in both the circumferential and longitudinal directions. Excessive buoyancy of shield tunnel leads to opening and misalignment at the joints of tunnel structure, and in severe cases, causes water leakage and structural damage. Anti buoyancy plates and anti pull piles are usually used for controlling the buoyancy of existing shield tunnels. These measures are generally based on the following idea: prior to shield tunnel construction, deploy anti buoyancy plates and anti pull piles in selected areas, and usually in advance for situations where the geological conditions are poor, and there is no solution for some buoyancy measures that have already been implemented. Furthermore, this requires the construction of a large number of piles in advance, greatly increasing construction costs and occupied spaces.

SUMMARY

The main objective of the present invention is to propose a control apparatus and method for buoyancy adjustment of shield tunnel segments, aiming to control the buoyancy of tunnels that have already experienced buoyancy during construction or operation.

In order to achieve the above objectives, the present invention proposes a control apparatus for buoyancy adjustment of shield tunnel segments, comprising:

an anchor rod in which an axial accommodating cavity with a rear end opening is provided, a first slurry channel extending forward to the outer peripheral wall of anchor rod is provided at the inner end wall of accommodating cavity, and the anchor rod is squeezed into the formation as a whole through the tunnel segment;

a countersunk bolt that is inserted into the accommodating cavity, and the front end of countersunk bolt is provided with a second slurry channel extending to the rear end, and the second slurry channel is used to communicate with the first slurry channel;

a locking mechanism that is located in the accommodating cavity to lock countersunk bolt in the accommodating cavity; and a threaded connection structure that is screwed onto countersunk bolts and, directly or through intermediate components, pushes against tunnel segments.

The present invention also proposes a control method for buoyancy adjustment of shield tunnel segments, comprising the following steps:

S1: lock countersunk bolt in the accommodating cavity through the locking mechanism, and squeeze anchor rod into the formation through the segments from inside the tunnel at the area subjected to buoyancy control;

S2: drive anchor rod to rotate and allow the slurry to flow into the formation through the second and first slurry channels until the grouting is completed;

S3: solidified slurry combines anchor rod with the formation in the area as a whole, and the threaded connection structure advances along countersunk bolt within the tunnel for a predetermined distance and, directly or through intermediate components, pushes against the segments.

The present invention discloses a control apparatus and method for buoyancy adjustment of shield tunnel segments, wherein the inner end wall of anchor rod accommodating cavity is provided with a first slurry channel extending forward to the outer peripheral wall of anchor rod, the countersunk bolt is provided with a second slurry channel passing through the front and rear end faces of the countersunk bolt, and a locking structure is disposed in the accommodating cavity to lock the countersunk bolt in the accommodating cavity and connect the first slurry channel and second slurry channel. After the anchor rod is squeezed into the formation via the through-hole of segments, the slurry inside the tunnel is injected into the second slurry channel, so that the slurry enters the formation for diffusion through the second and first slurry channels, and the solidified slurry can combine anchor rod with the formation in the area as a whole to provide tensile strength for anchor rod. Afterwards the threaded connection structure advances along countersunk bolt within the tunnel for a predetermined distance and, directly or through intermediate components, pushes against the segments, thereby controlling the buoyancy of segments by pushing them down together. The entire construction process which can be carried out during the construction or operation period greatly reduces construction costs and space.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

The present invention proposes a control apparatus for buoyancy adjustment of shield tunnel segments.

In the embodiments of the present invention, as shown in FIGS. 1 to 8, the control apparatus for buoyancy adjustment of shield tunnel segments comprises an anchor rod 1, a countersunk bolt 2, a locking structure and threaded connection structure 3. An axial accommodating cavity 10 with a rear end opening (the rear end referred to here is the end of anchor rod 1 facing the inside of tunnel after construction) is provided inside anchor rod 1, a first slurry channel 101 extending forward (The forward direction referred to here can be axial straight forward, inclined forward, or curved forward, etc.) to the outer peripheral wall of anchor rod 1 is provided at the inner end wall of accommodating cavity 10, and the anchor rod 1 is squeezed into the formation as a whole through the tunnel segments 100; a countersunk bolt 2 is inserted into the accommodating cavity 10, and the front end of countersunk bolt 2 is provided with a second slurry channel 20 extending to the rear end (i.e. axially running through countersunk bolt 2), and the second slurry channel 20 is used to communicate with the first slurry channel 101. The locking mechanism is located in the accommodating cavity 10 to lock countersunk bolt 2 in the accommodating cavity 10 and to prevent the movement of countersunk bolt 2 relative to anchor rod 1; and the threaded connection structure 3 is screwed onto countersunk bolts 2 and, directly or through intermediate components, pushes against tunnel segments 100.

After anchor rod 1 is squeezed into the formation as a whole via the pre-formed or on-site drilled through hole (not shown) on the segments 100, the slurry inside the tunnel is injected into the second slurry channel 20, so that the slurry enters the formation for diffusion through the second slurry channel 20 and first slurry channel 10, and the solidified slurry can combine anchor rod 1 with the formation in the area as a whole to provide tensile strength for anchor rod 1. Afterwards the threaded connection structure 3 advances along countersunk bolt 2 within the tunnel for a predetermined distance and, directly or through intermediate components, pushes against the segments 100, thereby controlling the buoyancy of segments 100 by pushing them down together. The entire construction process which can be carried out during the construction or operation period greatly reduces construction costs and space.

Figure 1:
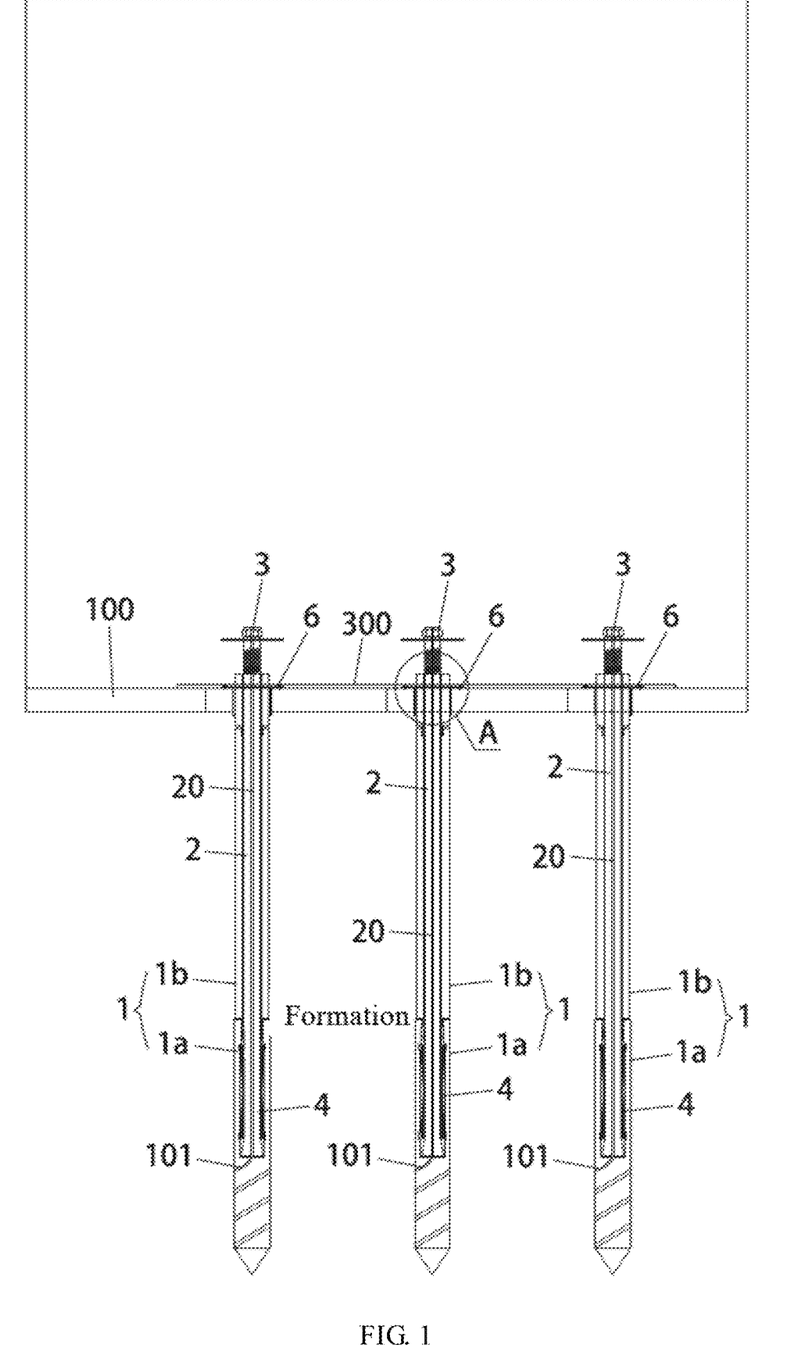
FIG. 1 is a longitudinal sectional view of control apparatus for buoyancy adjustment of shield tunnel segments and tunnel (before the extension section is removed)
Figure 2:
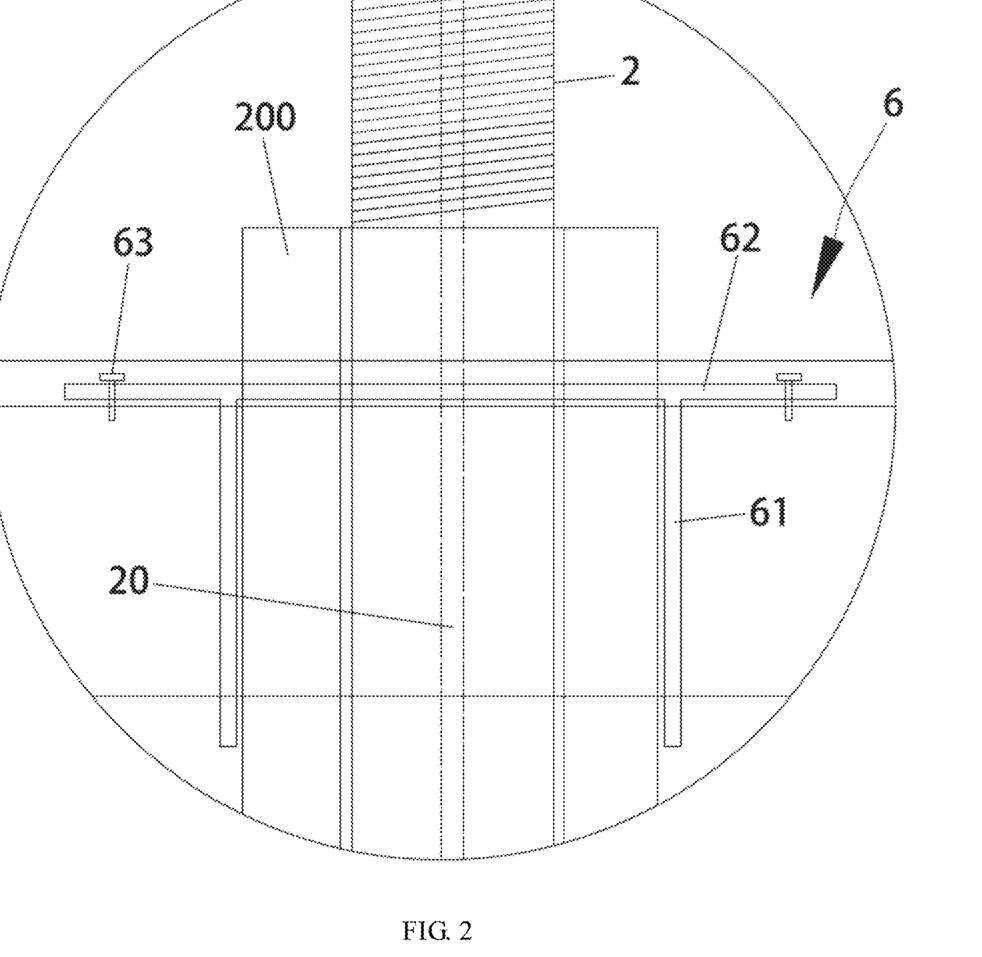
FIG. 2 is an enlarged view of part A in FIG. 1.
Figure 3:
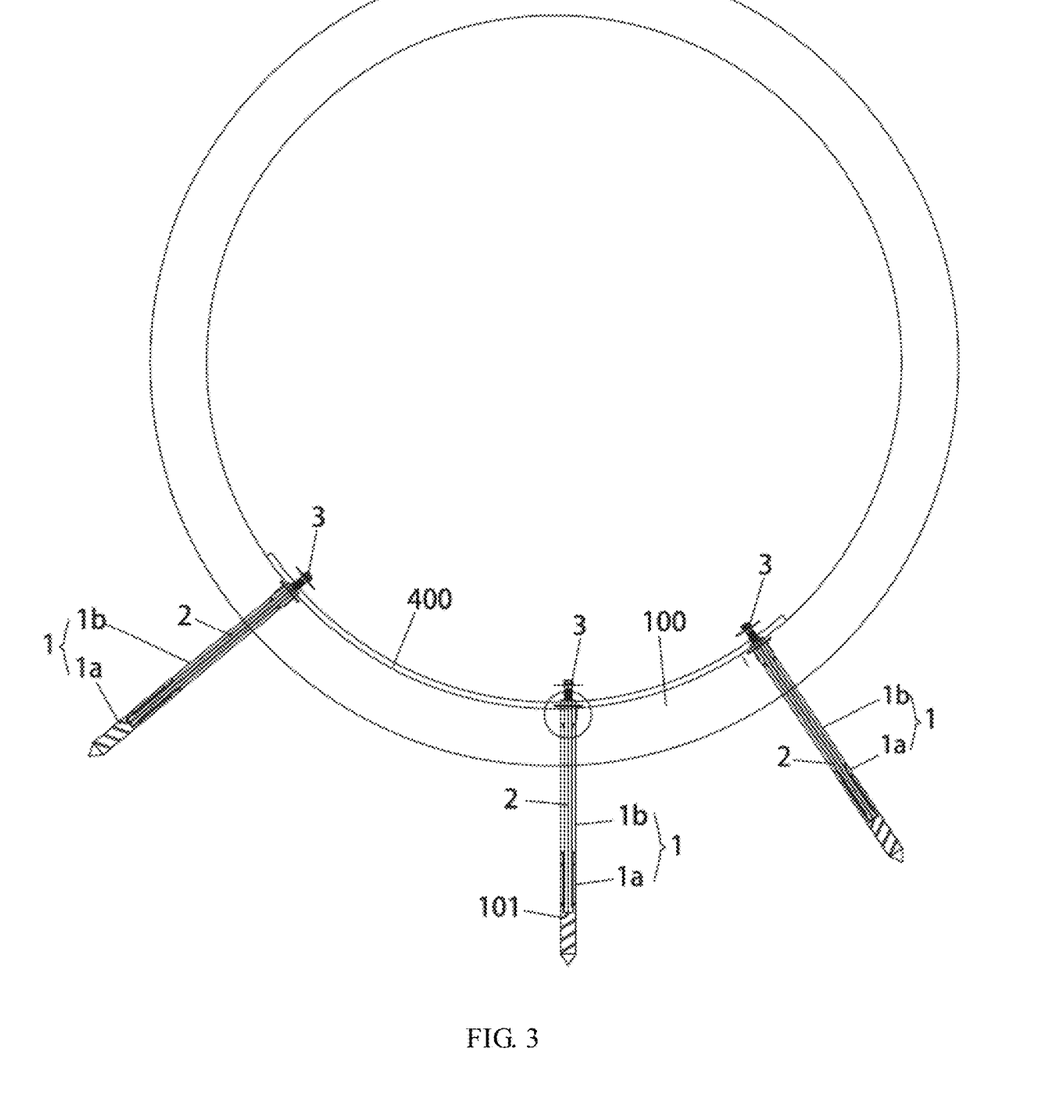
FIG. 3 is a transverse sectional view of control apparatus for buoyancy adjustment of shield tunnel segments and tunnel (before the extension section is removed)

In further, as shown in FIGS. 1 to 3, the present invention also comprises a plugging structure 6 that is disposed at the through hole (not shown) of segments 100 for anchor rod 1 to pass through and, directly or in conjunction with waterproof filler, seals the gap at the through hole, so as to prevent groundwater from seeping into the tunnel through gaps during construction. In some embodiments, as shown in FIG. 2, the plugging structure 6 comprises a sleeve body 61 that can be sleeved onto countersunk bolt 2 and extend into the through hole, and a pad body 62 that extends radially from the rear end of sleeve body 61, and the pad body 62 can be fixed to the inner wall of segments 100. Preferably, the pad body 62 can be fixed to the inner wall of segments 100 by screws 63.

Understandably, waterproof fillers can be implemented in various ways and, in some embodiments of the present invention, can be rubber rings or epoxy resins and, in case of epoxy resin, the pad body 62 is provided with an injection hole (not shown), through which epoxy resin is injected into the gaps. Specifically, epoxy resin can be injected in one go, or injected continuously or intermittently during construction (including but not limited to the process of squeezing anchor rod 1 into the formation and injecting slurry into the formation) according to geological conditions, ensuring that groundwater around the tunnel is prevented from seeping into the tunnel through gaps during construction.

Understandably, epoxy resin is a waterproof material that expands and has pumpability when it comes into contact with water. The epoxy resin injected into the gap expands and seals the gap when it comes into contact with groundwater, achieving the purpose of waterproofing.

Figure 4:
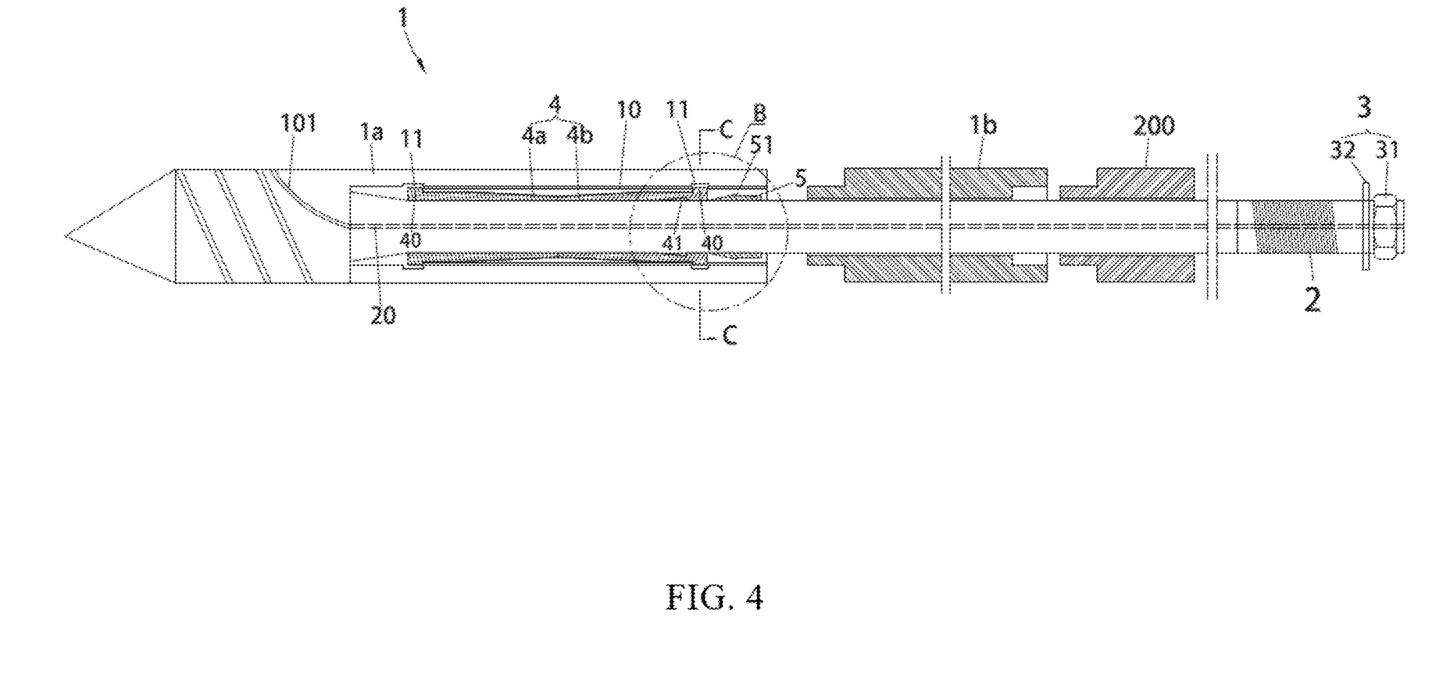
FIG. 4 is an exploded schematic diagram of the anchor rod, locking structure, countersunk bolt, threaded connection structure, and extension section.
Figure 5:
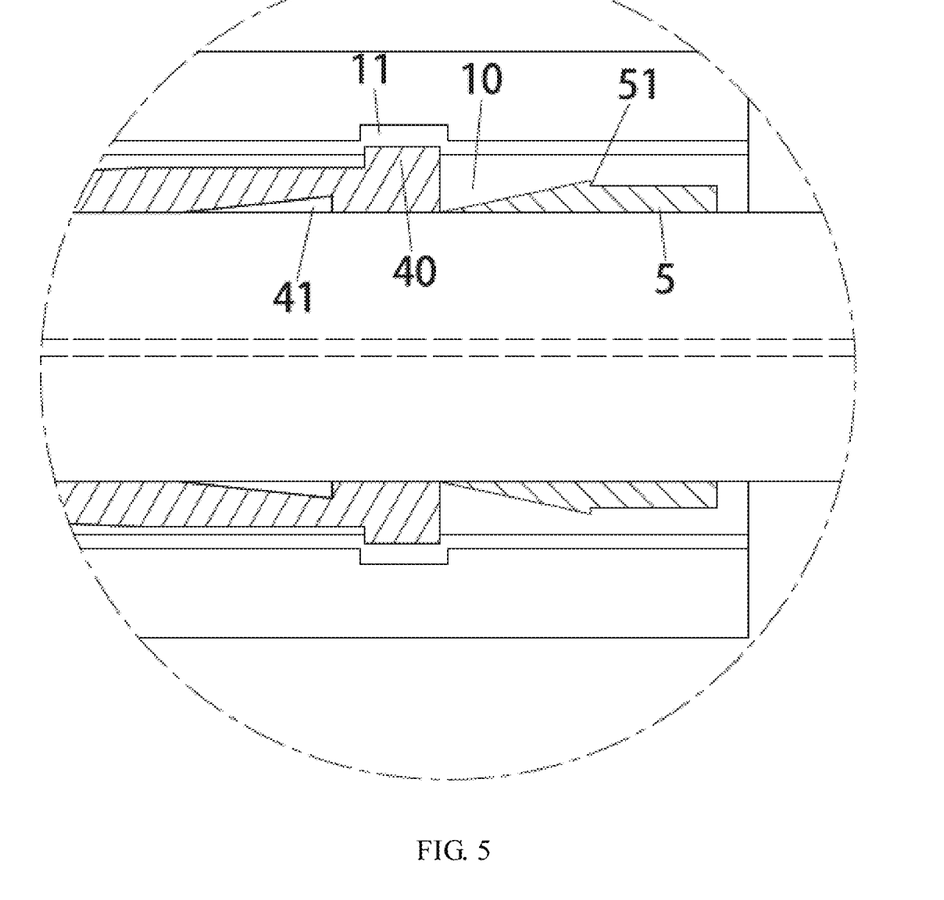
FIG. 5 is an enlarged view of part B in FIG. 4.

In the embodiment of the present invention, as shown in FIG. 4, the threaded connection structure 3 also has various embodiments, for example, comprising a nut 31, or a nut 31 and a washer 32, and adding a washer 32 can improve the locking force of the nut 31.

In some embodiments of the present invention, the locking mechanism comprises an expansion sleeve 4 that is expanded through inner compression and an annular cone sleeve 5 that drives expansion sleeve 4 to expand, the expansion sleeve 4 and annular cone sleeve 5 are distributed in front and behind and fitted on the position of countersunk bolt 2 near the head, the rear end of expansion sleeve 4 is provided with an outward protruding block 40, a recessed clamping platform 11 that fits the block 40 is provided at a position on peripheral wall of accommodating cavity 10 corresponding to the block 40, and the inner side of expansion sleeve 4 is also provided with an inward recessed positioning platform 41, and one end of the annular cone sleeve 5 facing expansion sleeve 4 is provided with a positioning portion 51 that is clipped into the positioning platform 41 to push forward against the annular cone sleeve 5, so that annular cone sleeve 5 is inserted inside expansion sleeve 4 to make expansion sleeve 4 expand radially and drive the block 40 of expansion sleeve 4 clip into the clamping platform 11; meanwhile, the positioning portion 51 of annular cone sleeve 5 is also clipped into the recessed positioning platform 41 of expansion sleeve 4, and the anchor rod 1, expansion sleeve 4, annular cone sleeve 5, and countersunk bolt 2 are fixed relative to each other to prevent the movement of countersunk bolt 2 relative to anchor rod 1 during construction.

Understandably, the countersunk bolt 2 is consistent with the countersunk bolt 2 of a general expansion bolt, and has a front end, that is, the end that penetrates into the accommodating cavity 10, a conical head, and a rear end, that is, the part left outside the accommodating cavity 10, which is provided with external threads for screwing the threaded connection structure 3.

In further, in order to improve the locking strength between anchor rod 1 and countersunk bolt 2, the front end of expansion sleeve 4 is also provided with an outwardly protruding block 40 and, correspondingly, the peripheral wall of accommodating cavity 10 is also provided with a recessed clamping platform 11 that fits the block 40 at front end to push forward against the annular cone sleeve 5, and when the annular cone sleeve 5 is inserted inside expansion sleeve 4 to make the block 40 at front end clip into the clamping platform 11, the expansion sleeve 4 will move forward slightly under the pushing force of annular cone sleeve 5; during the forward movement, the front end of expansion sleeve 4 will expand radially under the compression of the conical head of countersunk bolt 2, and the block 40 at front end will also clip into the corresponding clamping platform 11, so as to better fix the anchor rod 1, expansion sleeve 4, annular cone sleeve 5, and countersunk bolt 2 together.

Understandably, expansion sleeve 4 can be a one-piece structure, or composed of two adjacent sections 4a and 4b at the front and rear (see FIG. 4).

Figure 6:
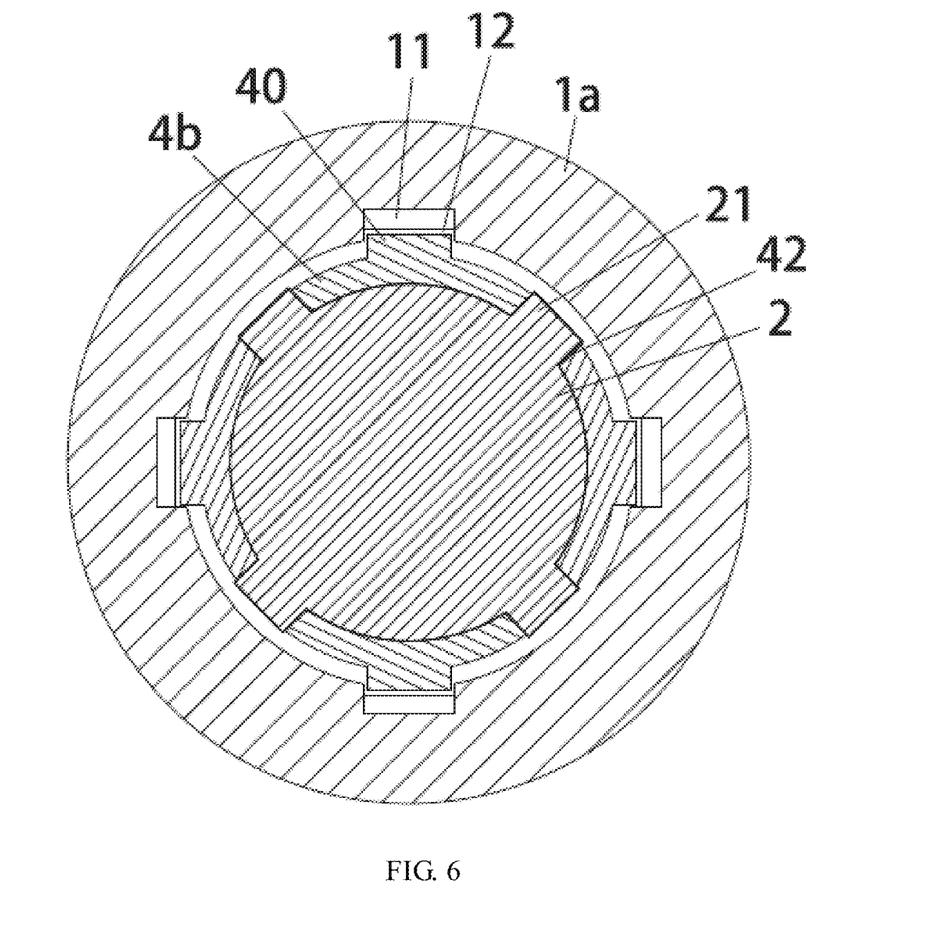
FIG. 6 is a cross-sectional view of FIG. 4 along the C-C direction.
Figure 7:
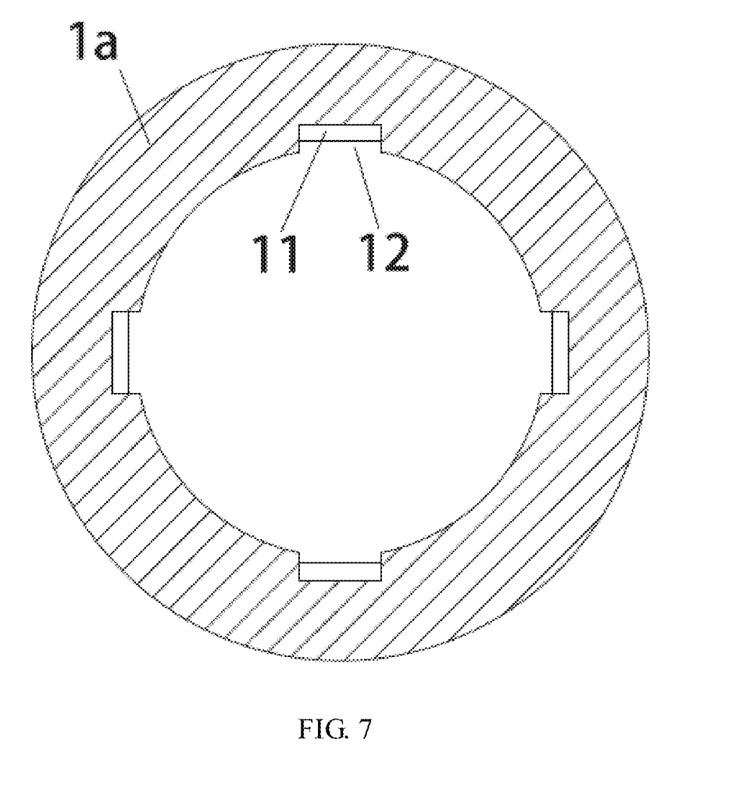
FIG. 7 is a transverse sectional view of the front section of anchor rod.
Figure 8:
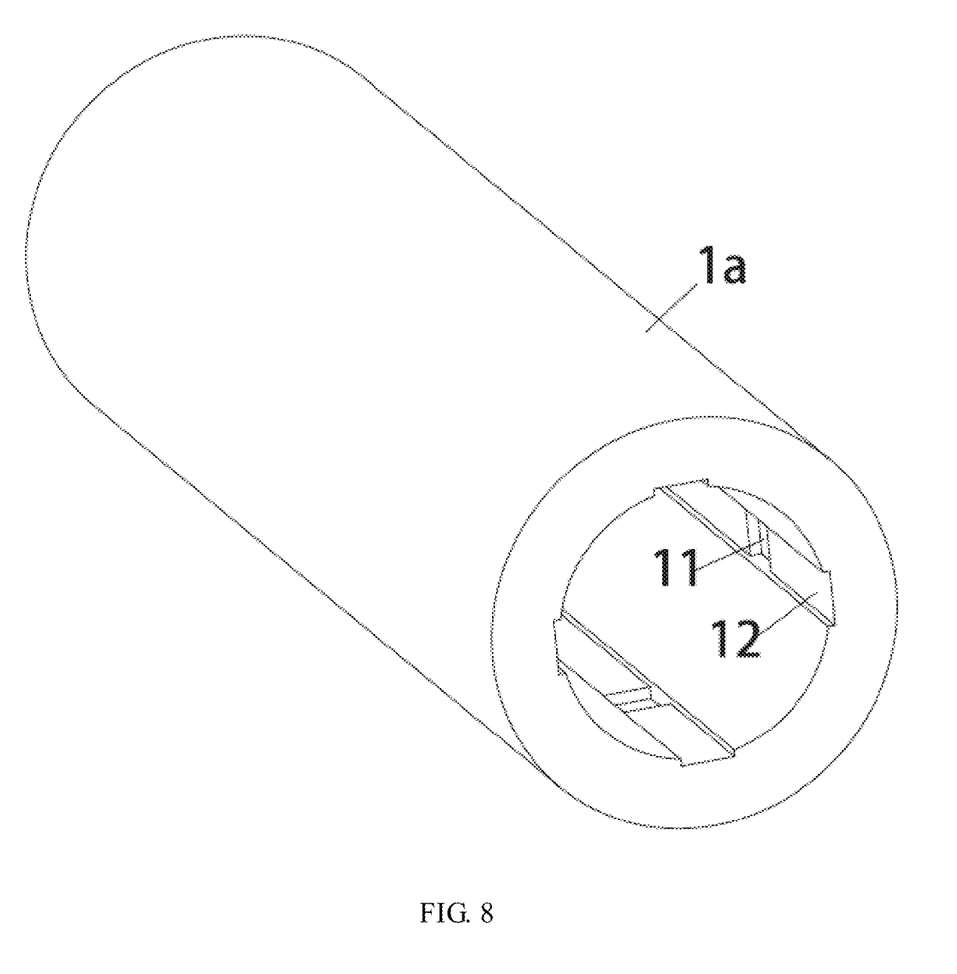
FIG. 8 is a three-dimensional diagram of the front section of anchor rod.

In the embodiments of the present invention, as shown in FIGS. 6 and 7, a plurality of clamping platforms 11 in front and behind the wall of accommodating cavity 10 are distributed radially, and as shown in FIG. 7, four or more clamping platforms are distributed in the circumferential direction; the clamping platform 11 has rectangular cross sections, and the rectangular clamping block 40 on the expansion sleeve 4 that fits the clamping platform 11 can prevent the countersunk bolt 2 from rotating relative to the anchor rod 1 and also prevent the expansion sleeve 4 from coming out, thereby improving the locking strength. Besides, the inner wall of accommodating cavity 10 is provided with a guide groove 12 that limit and guide the clamping blocks 40, and a plurality of guide grooves 12 are disposed around the circumferential wall of accommodating cavity 10 and in parallel with the axis of sleeve, and the clamping platform 11 is disposed at the guide grooves 12, and when the countersunk bolt 2 is located in the accommodating cavity 10, the clamping block 40 disposed on clamping platform is first inserted into the guide groove 12, and then moves along the guide groove 12, effectively avoiding the failure of card block 40 to be smoothly clipped into the clamping platform 11 due to the misalignment of countersunk bolt 2 during its insertion and compression on the expansion sleeve 4.

In the embodiment of the present invention, the recessed positioning platforms 41 on the inner wall of expansion sleeve 4 can be annular grooves disposed along the circumference, or several, for example, four positioning platforms 41, can be uniformly spaced along the circumference; In addition, in order to make it easier to insert annular cone sleeve 5 into expansion sleeve 4, the end of annular cone sleeve 5 facing expansion sleeve 4 is conical, and the positioning portion 51 is disposed on the outer wall of annular cone sleeve 5, and the outer wall of positioning portion 51 is an inclined plane extending to the front end of annular cone sleeve 5, the cross-section of recessed positioning platform 41 is in a triangle shape that fits the end of annular cone sleeve 5 and the positioning portion 51, forming a pointed end of annular cone sleeve 5, so that the annular cone sleeve 5 can be more easily inserted between expansion sleeve 4 and countersunk bolt 2, driving the expansion sleeve 4 to deform and expand.

In further, the countersunk bolt 2 has a radially extending limit block 21, and the rear end of expansion sleeve 4 is provided with an axially extending limit groove 42, and the limit block 21 fits and moves axially along the limit groove 42, and limit block 21 that is inserted into the limit groove 42 can prevent the countersunk bolt 2 from rotating relative to expansion sleeve 4. Optionally, limit groove 42 can or does not run through the outer peripheral wall of expansion sleeve 4 and, if not, the expansion sleeve 4 has a relatively high strength.

In another embodiment of the present invention, expansion sleeve 4 can be fixed to countersunk bolt 2 by screws, so there is no need to set the above-mentioned limit block 21 and limit groove 42, which can also prevent the countersunk bolt 2 from rotating relative to the expansion sleeve 4.

In the embodiments of the present invention, the anchor rod 1 comprises a front section 1a and a rear section 1b, and the locking device is disposed inside the front section 1a, and the front end of rear section 1b is connected to the front section 1a through a threaded fit. Specifically, the rear end of front section 1a is provided with internal threads, and the front end of rear section 1b is provided with external threads, the front end of rear section 1b is connected to the rear end of front section 1a through thread fit, and the annular cone sleeve 5 is pushed forward inside the expansion sleeve 4 by the rear section 1b to radially expand the expansion sleeve 4. Specifically, insert expansion sleeve 4 and annular cone sleeve 5 onto countersunk bolt 2 in sequence; then insert the countersunk bolt 2, and the expansion sleeve 4 and annular cone sleeve 5 fitted hereon into the front section 1a of anchor rod 1; afterwards insert the rear section 1b onto countersunk bolt 2 and screw it into the rear end of front section 1a and, during the process, the rear section 1b pushes annular cone sleeve 5 forward to insert inside the expansion sleeve 4 to radially expand the expansion sleeve 4.

Of course, the annular cone sleeve 5 can also be inserted into the inner side of the expansion sleeve 4 under the pushing of other auxiliary tools before connecting the rear section 1b and the front section 1a, and the expansion sleeve 4 can be radially expanded. For example, a cylinder with an inner diameter slightly larger than the threaded end of the countersunk bolt 2 can be sleeved onto countersunk bolt 2 and pressed against the rear end of the annular cone sleeve 5. Then, the cylinder can be pushed with a jack to insert the annular cone sleeve 5 into the inner side of the expansion sleeve 4 and expand it until the clamp block 40 of the expansion sleeve 4 is clamped into the clamp 11 of the peripheral wall of the receiving chamber 10. At the same time, the positioning part 51 of the annular cone sleeve 5 is also clamped into the positioning recess 41 of the expansion sleeve 4, thereby locking the anchor rod 1, expansion sleeve 4, and annular cone sleeve. Set 5 and countersunk bolt 2 are relatively fixed; Then, remove the cylinder and screw the rear section 1b onto the front section 1a.

In some embodiments of the present invention, the front end of anchor rod 1 has a drill bit portion to facilitate the drilling machine to drive anchor rod 1 to rotate and drill into a predetermined depth of the formation. It is also possible to drill a hole of a predetermined depth and then drive anchor rod 1 into the hole through a pressure mechanism.

In further, a one-way valve is disposed at the first slurry channel 101 to prevent water or slurry from flowing into the accommodating cavity 10 from the formation.

It should be noted that the above embodiment provides only an explanation of one buoyancy control apparatus, and in practice, a plurality of buoyancy control apparatuses need to be deployed in the circumferential and longitudinal directions of a tunnel and, during such deployment process, axial rigid plates 300 and circumferential rigid plates 400 (i.e. the above-mentioned intermediate component) can be installed on the inner wall of tunnel segment 100 to connect a plurality of buoyancy control apparatuses in the axial and circumferential directions to jointly play the anti-buoyancy role of segment 100. Preferably, the axial rigid plate 300 and circumferential rigid plate 400 can be made of steel plates.

In some embodiments of the present invention, an elastic sealing ring (not shown) is provided at a position where the front end face of countersunk bolt 2 is located on the periphery of the second slurry channel 20 and/or the inner end wall of accommodating cavity 10 is located on the periphery of the first slurry channel 101, the elastic sealing ring is elastically sealed against the front end face of countersunk bolt 2 and the inner end wall of accommodating cavity 10, so as to seal the gap between the first slurry channel 101 and the second slurry channel 20 when there is a gap between the front end face of countersunk bolt 2 and the inner end wall of accommodating cavity 10, ensuring that the slurry can flow into the first slurry channel 101 through the second slurry channel 20. Specifically, the elastic sealing ring is a rubber ring or a silicone ring.

Embodiments of the control method for buoyancy adjustment of shield tunnel segments of the present invention are introduced below, following the introduction of embodiments of the buoyancy control apparatus for shield tunnel segments. The specific structure of buoyancy control apparatus for shield tunnel segments is described in the above embodiments, which will not be elaborated here.

In the embodiments of the present invention, the control method for buoyancy adjustment of shield tunnel segments comprises the following steps:

S1: lock countersunk bolt 2 in the accommodating cavity 10 through the locking mechanism, and squeeze anchor rod 1 into the formation through the segments 100 from inside the tunnel at the area subjected to buoyancy control;

Specifically, when the front end of anchor rod 1 has a drill bit, a drilling mechanism such as a drilling trolley or an air drill can be used to drive anchor rod 1 to rotate and drill into the formation at a predetermined depth. The specific methods of drilling are described in various embodiments in prior art, which will not be elaborated here.

When anchor rod 1 is not suitable for drilling, after a hole of a predetermined depth is drilled using a drilling rig, anchor rod 1 can be driven into the hole by a pressure mechanism. The specific methods of drilling and driving anchor rod 1 into the borehole are described in various embodiments in prior art which will not be elaborated here.

In some embodiments of the present invention, the locking mechanism comprises an expansion sleeve 4 that is expanded through inner compression and an annular cone sleeve 5 that drives expansion sleeve 4 to expand, the expansion sleeve 4 and annular cone sleeve 5 are distributed in front and behind and fitted on the position of countersunk bolt 2 near the head, the rear end of expansion sleeve 4 is provided with an outward protruding block 40, a recessed clamping platform 11 that fits the block 40 is provided at a position on peripheral wall of accommodating cavity 10 corresponding to the block 40, and the inner side of expansion sleeve 4 is also provided with an inward recessed positioning platform 41, and one end of the annular cone sleeve 5 facing expansion sleeve 4 is provided with a positioning portion 51 that is clipped into the positioning platform 41 to push forward against the annular cone sleeve 5, so that annular cone sleeve 5 is inserted inside expansion sleeve 4 to make expansion sleeve 4 expand radially and drive the block 40 of expansion sleeve 4 clip into the clamping platform 11; meanwhile, the positioning portion 51 of annular cone sleeve 5 is also clipped into the recessed positioning platform 41 of expansion sleeve 4, and the anchor rod 1, expansion sleeve 4, annular cone sleeve 5, and countersunk bolt 2 are fixed relative to each other to prevent the movement of countersunk bolt 2 relative to anchor rod 1 during construction.

In step S1, the process of locking countersunk bolt 2 in the accommodating cavity 10 by the locking mechanism comprises:

S11: insert expansion sleeve 4 and annular cone sleeve 5 onto countersunk bolt 2 in sequence;

S12: insert the countersunk bolt 2, and the expansion sleeve 4 and annular cone sleeve 5 fitted hereon into the front section 1a of anchor rod 1;

S13: insert the countersunk bolt 2, and the expansion sleeve 4 and annular cone sleeve 5 fitted hereon into the front section 1a of anchor rod 1; afterwards insert the rear section 1b onto countersunk bolt 2 and screw it into the rear end of front section 1a and, during the process, the rear section 1b pushes annular cone sleeve 5 forward to insert inside the expansion sleeve 4 to radially expand the expansion sleeve 4, so that the clamping block 40 of expansion sleeve 4 is clipped into the clamping platform 11 on the peripheral wall of accommodating cavity 10 and meanwhile, the positioning portion 51 of annular cone sleeve 5 is also clipped into the recessed positioning platform 41 of expansion sleeve 4, and the anchor rod 1, expansion sleeve 4, annular cone sleeve 5, and countersunk bolt 2 are fixed relative to each other to prevent the movement of countersunk bolt 2 relative to anchor rod 1 during construction.

Of course, before the rear section 1b is connected to the front section 1a, the annular cone sleeve 5 can also be pushed by other auxiliary tools to be inserted inside expansion sleeve 4, causing the expansion sleeve 4 to expand radially and, for example, a cylinder with an inner diameter slightly larger than the threaded end of countersunk bolt 2 can be inserted into countersunk bolt 2 and pressed against the rear end of annular cone sleeve 5, and then the cylinder can be pushed with a jack to insert annular cone sleeve 5 into expansion sleeve 4 and expand the expansion sleeve 4 until the clamping block 40 of expansion sleeve 4 is inserted into the clamping platform 11 on peripheral wall of the accommodating cavity 10 and meanwhile, the positioning portion 51 of annular cone sleeve 5 is also snapped into the recessed positioning platform 41 of expansion sleeve 4, so that the anchor rod 1, expansion sleeve 4, annular cone sleeve 5 and countersunk bolt 2 are fixed relative to each other; then, the cylinder is taken out and the rear section 1b is screwed onto the front section 1a.

In further, step S1, before or during the process of squeezing anchor rod into the formation, further comprises installing a plugging structure 6 at the through hole of segments 100 for anchor rod 1 to pass through and, directly through the plugging structure 6 or in conjunction with waterproof filler, sealing the gap at the through hole, so as to prevent groundwater from seeping into the tunnel through gaps during construction.

In some embodiments, as shown in FIG. 2, the plugging structure 6 comprises a sleeve body 61 that can be sleeved onto countersunk bolt 2 and extend into the through hole, and a pad body 62 that extends radially from the rear end of sleeve body 61, and the pad body 62 can be fixed to the inner wall of segments 100. Preferably, the pad body 62 can be fixed to the inner wall of segments 100 by screws 63.

Understandably, waterproof fillers can be implemented in various ways and, in some embodiments of the present invention, can be rubber rings or epoxy resins and, in case of epoxy resin, the pad body 62 is provided with an injection hole (not shown), through which epoxy resin is injected into the gaps. Specifically, epoxy resin can be injected in one go, or injected continuously or intermittently during construction (including but not limited to the process of squeezing anchor rod 1 into the formation and injecting slurry into the formation) according to geological conditions, ensuring that groundwater around the tunnel is prevented from seeping into the tunnel through gaps during construction.

Understandably, epoxy resin is a waterproof material that expands and has pumpability when it comes into contact with water. The epoxy resin injected into the gap expands and seals the gap when it comes into contact with groundwater, achieving the purpose of waterproofing.

S2: drive anchor rod 1 to rotate and allow the slurry to flow into the formation through the second slurry channel 20 and first slurry channel 101 until the grouting is completed;

Specifically, the slurry can be cement slurry, or a mixture of cement slurry and epoxy resin. There are various embodiments of the specific grouting method in the prior art, which will not be elaborated here.

It should be noted that in step S2, the anchor rod 1 has been squeezed into the predetermined depth, and therefore should be simply rotated in place during the grouting process. Injecting grout while rotating can better spread the slurry to the surrounding formation, thereby combining anchor rod 1 with the formation as a whole.

S3: solidified slurry combines anchor rod 1 with the formation in the area as a whole, and the threaded connection structure 3 advances along countersunk bolt 2 within the tunnel for a predetermined distance and, directly or through intermediate components, pushes against the segments 100, thereby controlling the buoyancy of segments 100 by pushing them down together, and the entire construction process which can be carried out during the construction or operation period greatly reduces construction costs and space.

Understandably, after the slurry solidifies, anchor rod 1 is firmly integrated with the formation in the area, providing a large tensile force for the anchor rod 1 and therefore, when the threaded connection structure 3 is screwed along countersunk bolt 2 and, directly or through the intermediate component, pushes against the segments 100, the anchor rod 1 can remain relatively stationary, so that the segments 100 are pushed down together by the thrust force of threaded connection structure 3 to control the buoyancy of segments 100.

In further, in order to facilitate the overall insertion of anchor rod 1 into the formation and to reserve space for the threaded connection structure to push the segments, the step further comprises assembling an extension section 200 at the rear end of anchor rod 1 before squeezing anchor rod 1 into the formation through the segments 100, and removing the extension section 200 from anchor rod 1 after slurry solidification.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A control apparatus for buoyancy adjustment of shield tunnel segments, the control apparatus comprising:
   an anchor rod including an axial accommodating cavity with a rear end opening, and a first slurry channel extending forward from an inner end wall of the accommodating cavity to an outer peripheral wall of the anchor rod, wherein the anchor rod is configured to be squeezed through a tunnel segment and into a formation;
   a countersunk bolt configured to be inserted into the accommodating cavity, wherein the countersunk bolt includes a second slurry channel extending from a front end to a rear end thereof, and the second slurry channel is configured to communicate with the first slurry channel;
   a locking mechanism configured to be located in the accommodating cavity to lock the countersunk bolt in the accommodating cavity; and
   a threaded connection structure configured to be screwed onto the countersunk bolt and, directly or through intermediate components, configured to push against the tunnel segment.

2. The control apparatus for buoyancy adjustment of shield tunnel segments according to claim 1, further comprising a plugging structure that is disposed at a through hole of the tunnel segment for the anchor rod to pass through and, directly or in conjunction with waterproof filler, seals a gap at the through hole.

3. The control apparatus for buoyancy adjustment of shield tunnel segments according to claim 1, wherein the locking mechanism comprises an expansion sleeve that is configured to be expanded through inner compression and an annular cone sleeve that is configure to drive the expansion sleeve to expand, the expansion sleeve and annular cone sleeve are distributed sequentially and fitted on the countersunk bolt adjacent the front end thereof, a rear end of the expansion sleeve is provided with an outwardly protruding block, a recessed platform that fits the block is provided at a position on a peripheral wall of the accommodating cavity corresponding to the block, an inner side of the expansion sleeve is also provided with an inwardly recessed positioning platform, and one end of the annular cone sleeve facing the expansion sleeve is provided with a positioning portion that is configured to be clipped into the positioning platform.

4. The control apparatus for buoyancy adjustment of shield tunnel segments according to claim 3, wherein the peripheral wall of the accommodating cavity is provided with a guide groove that limits and guides the block, a plurality of the guide grooves are disposed around the peripheral wall of the accommodating cavity, and the recessed platform is in communication with the guide grooves.

5. The control apparatus for buoyancy adjustment of shield tunnel segments according to claim 4, wherein the anchor rod comprises a front section and a rear section, and the locking device is disposed inside the front section, a rear end of the front section is provided with internal threads, and a front end of the rear section is provided with external threads, the front end of the rear section is connected to the rear end of the front section through thread fit, and the annular cone sleeve is pushed forward inside the expansion sleeve to radially expand the expansion sleeve.

6. The control apparatus for buoyancy adjustment of shield tunnel segments according to claim 3, wherein the countersunk bolt has a radially extending limit block, and the rear end of the expansion sleeve is provided with an axially extending limit groove, and the limit block fits and moves axially along the limit groove.

7. The control apparatus for buoyancy adjustment of shield tunnel segments according to claim 6, wherein the anchor rod comprises a front section and a rear section, and the locking device is disposed inside the front section, a rear end of the front section is provided with internal threads, and a front end of the rear section is provided with external threads, the front end of the rear section is connected to the rear end of the front section through thread fit, and the annular cone sleeve is pushed forward inside the expansion sleeve to radially expand the expansion sleeve.

8. The control apparatus for buoyancy adjustment of shield tunnel segments according to claim 3, wherein the anchor rod comprises a front section and a rear section, and the locking device is disposed inside the front section, a rear end of the front section is provided with internal threads, and a front end of the rear section is provided with external threads, the front end of the rear section is connected to the rear end of the front section through thread fit, and the annular cone sleeve is pushed forward inside the expansion sleeve to radially expand the expansion sleeve.

9. A buoyancy control method comprising the following steps:
provide the control apparatus for buoyancy adjustment of shield tunnel segments according to claim 1;
S1: lock the countersunk bolt in the accommodating cavity through the locking mechanism, and squeeze the anchor rod into the formation through the tunnel segment from inside the tunnel segment at the area subjected to buoyancy control;
S2: drive the anchor rod to rotate and allow a slurry to flow into the formation through the second and first slurry channels until grouting is completed;
S3: allow the slurry to solidify thereby combining the anchor rod with the formation, and advance the threaded connection structure advances along the countersunk bolt for a predetermined distance, so that the threaded connection structure, directly or through the intermediate components, pushes against the tunnel segment.

10. The buoyancy control method according to claim 9, wherein in step S1, the process of locking the countersunk bolt in the accommodating cavity by the locking mechanism comprises:
S11: insert an expansion sleeve and an annular cone sleeve onto the countersunk bolt in sequence;
S12: insert the countersunk bolt, and the expansion sleeve and annular cone sleeve fitted thereon together into a front section of the anchor rod;
S13: insert a rear section of the anchor rod along the rear end of the countersunk bolt and screw the rear section into the front section of the anchor rod such that the rear section pushes the annular cone sleeve forward to insert inside and radially expand the expansion sleeve and such that a clamping block of the expansion sleeve clips into a clamping platform on a peripheral wall of the accommodating cavity, wherein the anchor rod, expansion sleeve, annular cone sleeve, and countersunk bolt are thereby fixed relative to each other.

11. The buoyancy control method according to claim 9, wherein in step S1, before or during the process of squeezing the anchor rod into the formation, further comprising installing a plugging structure at a through hole of the tunnel segment for the anchor rod to pass through and, directly or in conjunction with waterproof filler, sealing a gap at the through hole.

12. The buoyancy control method according to claim 9, further comprising assembling an extension section at a rear end of the anchor rod before squeezing the anchor rod into the formation through the tunnel segment, and removing the extension section from the anchor rod after slurry solidification.

\* \* \* \* \*